United States Patent
Fehrenbach et al.

(10) Patent No.: US 10,656,002 B2
(45) Date of Patent: May 19, 2020

(54) RADAR FILL LEVEL MEASUREMENT DEVICE COMPRISING AN INTEGRATED LIMIT LEVEL SENSOR

(71) Applicant: VEGA Grieshaber KG, Wolfach (DE)

(72) Inventors: Josef Fehrenbach, Haslach i. K. (DE); Daniel Schultheiss, Hornberg (DE)

(73) Assignee: VEGA GRIESHABER KG, Wolfach (DE)

( * ) Notice: Subject to any disclaimer, the term of this patent is extended or adjusted under 35 U.S.C. 154(b) by 601 days.

(21) Appl. No.: 15/063,105

(22) Filed: Mar. 7, 2016

(65) Prior Publication Data

US 2016/0282168 A1 Sep. 29, 2016

(30) Foreign Application Priority Data

Mar. 27, 2015 (EP) ..................................... 15161432

(51) Int. Cl.
| | |
|---|---|
| *G01F 23/284* | (2006.01) |
| *G01F 23/24* | (2006.01) |
| *G01S 13/88* | (2006.01) |
| *G01S 7/40* | (2006.01) |
| *G01F 23/26* | (2006.01) |
| *G01S 13/86* | (2006.01) |

(Continued)

(52) U.S. Cl.
CPC .......... *G01F 23/284* (2013.01); *G01F 23/241* (2013.01); *G01F 23/242* (2013.01); *G01F 23/265* (2013.01); *G01S 7/40* (2013.01); *G01S 13/08* (2013.01); *G01S 13/86* (2013.01); *G01S 13/88* (2013.01); *G01S 2007/027* (2013.01)

(58) Field of Classification Search
CPC .... G01F 23/284; G01F 23/241; G01F 23/242; G01F 23/265; G01S 7/40; G01S 13/08; G01S 13/86; G01S 13/88; G01S 2007/027
USPC .......................................................... 342/124
See application file for complete search history.

(56) References Cited

U.S. PATENT DOCUMENTS 2,792,566 A * 5/1957 Shanhouse ............ G01F 23/241
340/620
3,392,581 A * 7/1968 Miller ................... G01F 23/265
73/304 C (Continued)

FOREIGN PATENT DOCUMENTS

| DE | 10051025 A1 * 10/2000 | ............. G01S 15/88 |
|---|---|---|
| DE | 100 51 025 | 4/2002 |

(Continued)

*Primary Examiner* — Vladimir Magloire
*Assistant Examiner* — Nuzhat Pervin
(74) *Attorney, Agent, or Firm* — Fay Kaplun & Marcin, LLP

(57) ABSTRACT

A radar fill level measurement device includes a radar sensor unit which has comprising a radar antenna emitting a measurement signal towards a filling material surface. The radar fill level measurement device in addition includes a limit level sensor unit determining a fill level of the filling material. The limit level sensor unit detects when the spacing between the filling material surface and the radar antenna falls below a minimum spacing. A radar antenna arrangement is for a radar fill level measurement device. The radar antenna arrangement includes a radar antenna horn which has a housing and/or a cover, and a limit level sensor unit. At least part of the limit level sensor unit is arranged on the housing or on the cover or is integrated therein.

14 Claims, 5 Drawing Sheets

(51) Int. Cl.
   *G01S 13/08* (2006.01)
   *G01S 7/02* (2006.01)

(56) References Cited

U.S. PATENT DOCUMENTS

| | | | | |
|---|---|---|---|---|
| 3,475,719 | A * | 10/1969 | Akin | H01R 4/4863 439/668 |
| 4,275,846 | A * | 6/1981 | Coffee | A01M 7/0089 239/690 |
| 6,047,598 | A * | 4/2000 | Otto | G01F 23/284 340/621 |
| 8,037,753 | B2 * | 10/2011 | Fehrenbach | G01D 5/54 73/290 R |
| 2002/0059828 | A1 | 5/2002 | Muller | G01S 15/86 73/290 R |
| 2004/0079152 | A1 * | 4/2004 | Sorenson | G01F 23/38 73/313 |
| 2004/0183550 | A1 * | 9/2004 | Fehrenbach | G01D 5/54 324/662 |
| 2005/0225480 | A1 * | 10/2005 | Fehrenbach | G01F 23/284 342/124 |
| 2007/0216424 | A1 * | 9/2007 | Sieh | G01F 23/268 324/662 |
| 2008/0036644 | A1 * | 2/2008 | Skultety-Betz | G01S 7/032 342/22 |
| 2010/0145493 | A1 * | 6/2010 | Gommlich | G05B 19/0421 700/104 |
| 2011/0215821 | A1 | 9/2011 | Pavan | |
| 2013/0269414 | A1 * | 10/2013 | Ferraro | G01F 23/284 73/1.73 |
| 2013/0277351 | A1 * | 10/2013 | Lamesch | B60N 2/002 219/202 |
| 2014/0174172 | A1 * | 6/2014 | Hagg | G01F 23/284 73/290 V |
| 2014/0332032 | A1 * | 11/2014 | Lenk | G01F 23/00 134/18 |

FOREIGN PATENT DOCUMENTS

| | | | | |
|---|---|---|---|---|
| DE | 10051025 | A1 * | 4/2002 | H01Q 1/225 |
| DE | 102004041857 | A1 * | 8/2004 | G01F 23/284 |
| DE | 10 2004 041 857 | | 3/2006 | |
| DE | 102004041857 | A1 * | 3/2006 | G01F 23/284 |
| DE | 102006016381 | A1 * | 4/2006 | G01F 23/266 |
| DE | 102006051102 | A1 * | 10/2006 | G05B 19/052 |
| DE | 10 2006 016 381 | | 10/2007 | |
| DE | 102006016381 | A1 * | 10/2007 | G01F 25/0061 |
| DE | 10 2006 051 102 | | 4/2008 | |
| DE | 102006051102 | A1 * | 4/2008 | G05B 19/052 |
| DE | 203 21 736 | | 6/2009 | |
| DE | 102010064394 | A1 * | 12/2010 | G01F 25/0084 |
| DE | 10 2010 064 394 | | 7/2012 | |
| DE | 102010064394 | A1 * | 7/2012 | G01F 23/00 |
| DE | 102013113766 | A1 * | 12/2013 | G01F 23/2845 |
| DE | 10 2013 113 766 | | 6/2015 | |
| DE | 102013113766 | A1 * | 6/2015 | G01F 23/2845 |
| EP | 0668488 | A2 * | 2/1995 | G01F 25/0076 |
| EP | 0 668 488 | | 8/1995 | |
| EP | 0668488 | A2 * | 8/1995 | G01F 23/2962 |
| WO | 02/33439 | | 4/2002 | |
| WO | 2015/086225 | | 6/2015 | |

* cited by examiner

RADAR FILL LEVEL MEASUREMENT DEVICE COMPRISING AN INTEGRATED LIMIT LEVEL SENSOR

REFERENCE TO RELATED APPLICATIONS

This application claims the benefit of the filing date of European Patent Application Serial No. 15 161 432.8 filed 27 Mar. 2015, the disclosure of which application is hereby incorporated herein by reference.

FIELD OF THE INVENTION

The present invention relates to measuring fill levels by means of fill level measurement devices. The invention relates in particular to a radar fill level measurement device and to a radar antenna arrangement for a radar fill level measurement device.

BACKGROUND

Fill level measurement devices operating in accordance with the radar principle are intended to always provide a clear measurement result. This means that a measurement value within a measurement range can be provided always at a specified degree of accuracy. In the case of large distances, the prediction that the measurement value is greater than a maximum distance or that the measurement value cannot be determined is usually sufficient. In the case of short distances too, i.e. in the region close to the sensor, it is possible that the sensor may not be able to provide a sure identification of the maximum fill level or of the maximum level. In particular, radar sensors known thus far often do not provide a clear signal in the flooded state of the measuring sensor. Said signals may correspond for example to a very distant target, or it is possible for the received signal to be similar to a measurement signal inside an absorber.

In sensors known thus far, archiving functions are often used in order to follow and re-identify targets or echoes. However, since a sure identification is also required the first time the sensor is switched on, these functions cannot be used in the case of ambiguous echo relationships.

SUMMARY OF THE INVENTION

According to one aspect of the invention, a radar fill level measurement device is specified. The radar fill level measurement device comprises a radar sensor unit having a radar antenna for emitting a measurement signal towards a filling material surface. The radar fill level measurement device further comprises a limit level sensor unit. The radar sensor unit is designed to determine a fill level of the filling material, and the limit level sensor unit is designed to detect when the spacing between the filling material and the radar antenna falls below a minimum spacing.

It can also be provided for the value to only fall below the limit value in the event of the radar antenna or the radar sensor being flooded, with the result that it is only detected that the spacing between the filling material surface and the radar antenna has fallen below the minimum spacing when the radar antenna or the radar sensor is flooded. In particular, the minimum spacing to be detected between the filling material surface and the radar antenna can also have a negative value. It is possible for the limit level sensor unit to be designed to detect when the spacing between the filling material surface and the radar sensor, which may include the radar antenna, falls below the minimum spacing.

It is thus possible to be able to detect the fill level also in the region close to the measuring sensor, i.e. the radar sensor unit. In particular, too high a fill level or level can be detected when the minimum distance between the filling material surface and the radar antenna is reached. The radar sensor unit can be designed to emit the measuring signal towards the filling material surface, said measuring signal being reflected at the filling material surface and returning to the radar sensor unit. The fill level can thus be determined, for example on account of the transit time measurement. If the fill level increases above a specific limit value, resulting in the spacing between the filling material surface and the radar antenna falling below the minimum spacing, this can be detected by the limit level sensor unit, upon which a warning signal or warning notification can be output.

A limit level sensor unit of this kind can be a limit switch for example, which is attached in the region of the radar sensor unit. In other words, an additional limit switch, i.e. the limit level sensor unit, is provided in the region close to the radar sensor unit in order to provide sure identification of the fill level or the level, which limit switch can be adjusted so as to identify a flood, for example, and can subsequently output either a warning or a notification of a full state of a container.

When the fill level rises, the level increases, i.e. the spacing between the radar sensor unit and the filling material surface reduces. The radar sensor unit is designed to continuously measure the fill level of the filling material, which material is inside the container for example. If a specified maximum fill level is now reached, the spacing between the filling material surface and the radar antenna falls below the minimum spacing or the radar sensor unit is flooded, this can be detected by the limit level sensor unit or the limit switch, upon which a warning signal can subsequently be output. This is particularly advantageous since, when the spacing between the filling material surface and the radar sensor has fallen below the minimum spacing, the accuracy of the measurement results determined by the radar sensor unit can reduce. A warning can thus be promptly output, for example by means of an evaluation unit.

It should be noted that the limit level sensor unit can already detect that the spacing between the filling material surface and the radar antenna has fallen below the minimum spacing, even when the filling material surface has not yet reached the radar antenna. However, it is also possible for the limit level sensor unit to only detect that the spacing between the filling material surface and the radar antenna has fallen below the minimum spacing when the radar antenna or the radar sensor unit has already been flooded by the filling material. In any case, it can be ensured that measurement values which were determined by the radar sensor unit in the short range, i.e. when the spacing between the filling material surface and the radar antenna has fallen below the minimum spacing, are no longer used for a possible subsequent evaluation. Rather, the limit level sensor unit can provide a warning about too high a fill level and can further indicate that the fill level measurement values measured by the radar sensor unit may no longer be sufficiently accurate on account of the fill level being too high.

The radar antenna of the radar sensor unit can be designed, for example, as a horn antenna, a planar array, a parabolic antenna, a lens antenna, an array antenna or any other type of antenna.

According to an embodiment of the invention, the radar fill level measurement device further comprises a housing in which the radar antenna is arranged. In this case, the limit level sensor unit is arranged on or in the housing.

This means that the housing can accommodate both the radar antenna and the limit level sensor unit. It is further possible for the radar antenna to be fastened in the housing and for the limit level sensor unit to be fastened to the housing on the outside thereof. The limit level sensor unit can thus be accommodated in the same housing as the radar antenna or the sensor electronics. The limit level sensor unit or at least part of the limit level sensor unit can, however, also be attached in the antenna or in a cover of the antenna. In other words, the radar fill level measurement device comprises an integrated limit level sensor.

In the event of the limit level sensor unit being attached to the housing on the outside thereof, direct contact between the filling material and the limit level sensor unit can be achieved, which is advantageous in particular when measuring by means of a conductive method. In the case of a capacitive method, however, the electrodes can be moved into the inside of the housing, which has the advantage that the electrodes do not have to be in contact with the filling material. This is described in more detail in the description of the figures.

According to a further embodiment of the invention, the limit level sensor unit is designed to detect, on the basis of an electromagnetic signal, that the spacing between the filling material surface and the radar antenna has fallen below the minimum spacing.

This may for example be an electromagnetic signal, such as is also emitted by the radar sensor unit in order to determine the fill level of the filling material. Limit level acquisition by means of time-domain reflectometry (TDR) is possible for example. In this case, the fill level can be determined from a transit time measurement of the electromagnetic signal.

According to a further embodiment of the invention, the limit level sensor unit is a vibration sensor attached to the housing.

A vibration sensor of this kind comprises a tuning fork for example. In this case, it can be necessary for the vibration sensor, i.e. the tuning fork, to be in direct contact with the filling material in order to be able to detect said material. For example, the tuning fork or a rod of the vibration sensor protrudes into the filling material, which is a liquid for example, in order to thus detect that the spacing between the filling material surface and the radar antenna has fallen below the minimum spacing. Advantageously, the vibration sensor, which comprises the tuning fork or the rod, is arranged outside the housing in which the radar antenna or the radar sensor unit is arranged. In this case, the limit level sensor unit protrudes out of the housing, such that the vibration sensor can detect an overfilled state. The measurement values acquired by the vibration sensor are evaluated for example on the basis of an attenuation or a shift in the natural resonance of waves.

The vibration sensor can thus comprise either a rod or a tuning fork, which are incorporated in the housing of the radar sensor unit or the radar antenna. The tuning fork or the rod can be oriented horizontally or vertically. In other words, the rod or the tuning fork can be directed towards the filling material surface, i.e. vertical. However, it is also possible for the rod or the tuning fork to be oriented so as to be substantially parallel or parallel to the filling material surface, i.e. horizontal. A wide range of methods can be used in order to excite the vibration sensor, i.e. the tuning fork or the rod.

According to an embodiment of the invention, the limit level sensor unit is designed to detect, on the basis of a conductive measurement, that the spacing between the filling material surface and the radar antenna has fallen below the minimum spacing.

The conductive measurement of the limit level can be made for example using shield electrodes in order to reduce the sensitivity to deposits, condensation or dirt. When using a conductive measurement in order to acquire the limit level, i.e. in order to detect that the spacing between the filling material surface and the radar antenna has fallen below the minimum spacing, at least two electrodes can be arranged on the housing in which the radar antenna is located. The electrodes can be provided on an outer side of the housing, so that the electrodes are in direct contact with the filling material.

According to a further embodiment of the invention, at least two electrodes are attached to the housing of the radar fill level measurement device for the conductive measurement.

In this case, the at least two electrodes for the conductive measurement are attached to an outer side of the housing, so that direct contact with the filling material can be ensured. Furthermore, said at least two electrodes can be planar or rod-shaped. Advantageously, a conductive measurement method of this kind is a simple measurement principle, by means of which it is possible to promptly detect that the spacing between the filling material surface and the radar antenna has fallen below the minimum spacing, so that it is possible to detect a warning about a full or overfilled state of the container in which the filling material is located.

According to a further embodiment of the invention, the limit level sensor unit is designed to detect, on the basis of a capacitive measurement, that the spacing from the filling material surface has fallen below the minimum spacing.

In the case of the capacitive measurement, shield electrodes can be used in order to reduce the sensitivity to deposits, condensation or dirt. In the case of the capacitive measurement method, different dielectric constants or conductivities of the filling material are used for the purpose of fill level measurement or detection in order to detect that the limit level has been exceeded, i.e. that the spacing between the filling material surface and the radar antenna has fallen below the minimum spacing. In the case of a capacitive measurement, the limit level sensor unit can thus identify a change in the capacitance as soon as the spacing between the filling material surface and the radar antenna has fallen below the minimum spacing.

According to a further embodiment of the invention, electrodes are attached in the housing of the radar fill level measurement device for the capacitive measurement.

This means that the electrodes, as well as the radar antenna itself, can be fastened inside the housing. In addition, an electronics unit for the radar sensor unit and/or the limit level sensor unit can be provided in the housing. There are a number of possibilities for arranging the electrodes in the housing, which are described in more detail in the description of the figures.

According to a further embodiment of the invention, the electrodes for the capacitive measurement are arranged in the housing in an annular manner around the radar sensor unit.

The capacitive electrodes arranged in an annular manner can be arranged around the radar antenna of the radar sensor unit in the form of shield electrodes for example. The radar antenna is a horn antenna for example, which is oriented towards the filling material surface. The electrodes can then be arranged in an annular manner around the horn antenna in an end region thereof. An arrangement of this kind has the advantage that space is saved and the housing can accordingly be small.

According to a further embodiment of the invention, the radar antenna comprises a cover in which the electrodes for the capacitive measurement are integrated.

For example, the capacitive electrodes are integrated in cover or in the antenna cover of the horn antenna. The housing can thus be designed in a space-saving manner for example, in that the radar sensor unit simultaneously also accommodates the limit level sensor unit or at least part of the limit level sensor unit.

According to a further embodiment of the invention, the electrodes for the capacitive measurement are injection moulded into the cover of the radar antenna in the form of metal inserts.

In particular, the electrodes can be injection moulded into a plastics material as metal inserts in the housing or on the antenna cover. This means that the antenna cover can be produced together with the metal inserts, i.e. the electrodes, as an MID (molded interconnect device) part. It is also possible for the electrodes to be subsequently metallised on a plastics material. In particular what is known as the LDS (laser direct structuring) method is suitable for the structuring process for the metallisation. This means that the electrodes can be introduced into the cover in a specific arrangement by means of the metallisation.

According to a further embodiment, the electrodes for the capacitive measurement have a strip-like structure and are arranged relative to the radar sensor unit such that an electrical field of a signal emitted by the radar sensor unit is arranged or oriented perpendicularly to the strip-like structure of the electrodes.

For this purpose, the strip-like structure for the capacitive electrode can be attached directly in front of the radar antenna for example, i.e. between the radar antenna and the filling material surface. The capacitive electrode is attached to the cover of the radar antenna for example, it being possible for the cover to simultaneously also be part of the housing in which the radar antenna is located.

In this case, the strip-like structure can be arranged at an angle of 90° relative to the electrical field of the signal emitted by the radar sensor unit, in particular a microwave signal, so that the strip-like structure of the electrodes is permeable or invisible to said signal.

According to a further embodiment of the invention, at least part of the limit level sensor unit is arranged between the radar sensor unit and the filling material.

This is in particular the case when electrodes for the capacitive measurement are integrated in the cover of the radar antenna. It is therefore not necessary for the electrodes to be arranged around the radar antenna of the radar sensor unit or to be provided elsewhere on the housing, with the result that the housing can be designed in space-saving manner.

According to a further embodiment of the invention, the limit level sensor unit is designed to polarise a signal emitted by the radar sensor unit.

This can be achieved if the capacitive electrodes, i.e. the electrodes for the capacitive measurement, are arranged in the strip-like structure between the radar antenna and the filling material surface. For example only a signal, in particular a microwave signal, of a specific polarisation direction can pass through the strip-like structure of the electrodes. The strip-like structure is thus permeable or invisible to a signal of exactly this polarisation direction. In addition, the strip-like structure of the electrodes, which are arranged for example in parallel in this case, functions as a polarisation filter, meaning that the properties of the radar antenna can be further improved. The geometric arrangement of the limit level sensor unit can thus bring about additional advantages for the fill level measurement carried out by the radar sensor unit.

According to a further embodiment of the invention, the limit level sensor unit is arranged at least in part in an extension protruding out of the housing.

In particular, electrodes for the capacitive measurement can be arranged in the extension. The electrodes can thus also be arranged inside the housing, and contact between the electrodes and the filling material can be prevented. The extension can be approximately triangular when viewed in cross section. In this case, a tip of the triangle pointing towards the filling material can be blunted. Accordingly, the extension can be provided on the housing as a three-dimensional body, for example in the form of a truncated cone or a truncated pyramid. The extension can taper in the direction of the filling material surface. The extension can protrude out of the housing in the form of a protuberance. In this case, the electrodes can be arranged in such a way that they are closer to the filling material surface than the radar sensor unit is, at least when the radar sensor unit is not yet flooded. Three or more electrodes, in different forms, can be provided in the extension, two or more of the electrodes being attached to a tapering portion of the extension and a further electrode being attached horizontally to a base of the extension or to the blunted tip of the extension protruding out of the housing. However, it is also possible for just two electrodes to be provided in the extension, which electrodes are of different forms and can be attached in the extension. In addition, the electrodes can be embedded or integrally cast in the extension. Here, too, it is possible to already detect that the spacing between the filling material surface and the radar antenna has fallen below the minimum spacing, even when the fill level has not yet reached the cover of the radar antenna.

According to a further aspect of the invention, a radar antenna arrangement for a radar fill level measurement device is specified. The radar antenna arrangement comprises a radar antenna comprising a housing and/or a cover. In addition, the radar antenna arrangement comprises a limit level sensor unit, wherein at least part of the limit level sensor arrangement is arranged on the housing or on the cover or is integrated therein. The radar antenna can comprise a radar antenna horn for example.

This means that, for example, electrodes of the limit level sensor unit are arranged on the housing or on the cover, as has been described in the context of the capacitive or conductive measurement. It can be provided in particular for part of the limit level sensor unit to be integrated in the housing or the cover. This means that the electrodes can be integrated or incorporated in the housing or in the cover. It should be noted that the cover of the radar antenna horn can also be part of the housing and/or that these two parts can transition into one another. It should further be noted that the housing and the container in which the filling material is located can be two different components. In particular, the housing can be fastened as a separate component in an upper region of the container.

DETAILED DESCRIPTION OF EMBODIMENTS PROVIDED BY WAY OF EXAMPLE

Figure 1:
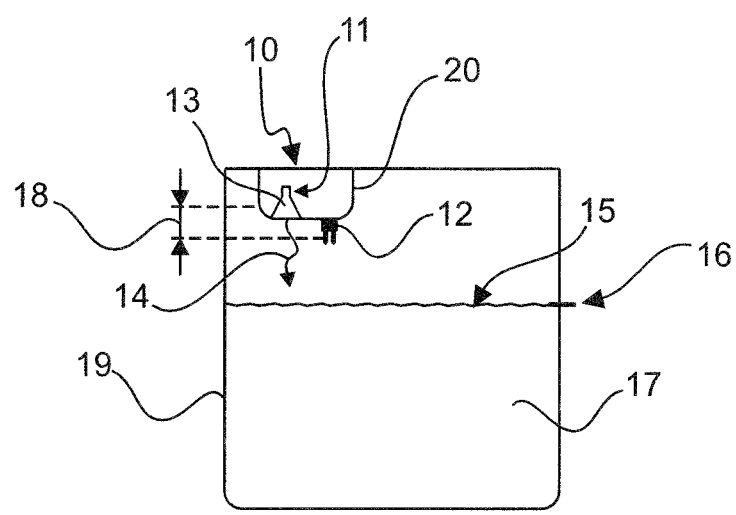
FIG. 1 shows a radar fill level measurement device comprising a radar sensor unit and a limit level sensor unit according to an embodiment of the invention.

The drawings are schematic and not to scale.

When, in the following description of the figures, the same reference numerals are used in different figures, they identify the same or similar elements. However, like or similar elements may also be denoted by different reference numerals.

FIG. 1 shows a radar fill level measurement device (10) for continuously measuring a fill level 16 of a filling material 17, which is located in a container 19 for example. In this case, the radar fill level measurement device 10 is arranged for example in an upper region of the container 19. The filling material 17 is provided in the container 19. The radar fill level measurement device 10 comprises a radar sensor unit 11 and a limit level sensor unit 12. The radar sensor unit 11 is preferably arranged inside a housing 20. The limit level sensor unit 12 can be arranged inside or outside the housing 20 for example. In the case shown in FIG. 1, the limit level sensor unit 12 is fastened on an outer side of the housing 20.

The radar sensor unit 11 is designed so as to emit a signal 14 towards a filling material surface 15 of the filling material 17. At the filling material surface 15, said signal 14 is reflected back to the radar sensor unit 11, it being possible to determine the spacing between the radar sensor unit 11 and the filling material surface 15 from a transit time measurement for example. In particular, the fill level 16 can be determined therefrom. The limit level sensor unit 12, which is a vibration sensor in the case shown in FIG. 1, can detect when a spacing between the filling material surface 15 and a radar antenna 13 of the radar sensor unit 11 falls below a minimum spacing 18. It should be noted that the radar antenna 13 of the radar sensor unit 11 can be designed as a horn antenna, a planar array, a parabolic antenna, a lens antenna, an array antenna or any other type of antenna.

If, for example, the fill level 16 increases such that the filling material surface 15 moves towards the limit level sensor 12, the limit level sensor 12 can detect that the spacing between the filling material surface 15 and the radar antenna 13 or the radar antenna unit 11 has fallen below the minimum spacing 18 as soon as the filling material 17 has reached the limit level sensor 12. In the case shown in FIG. 1, the limit level sensor unit 12 is, for example, a vibration sensor comprising a tuning fork which identifies that the spacing has fallen below the minimum spacing 18 as soon as the filling material 17 comes into contact with the tuning fork of the limit level sensor unit 12. A warning signal about an overfilled or full state of the container 19 can thus be promptly detected, which signal can ultimately be emitted to a user via an evaluation unit (not shown here). An arrangement of this kind is particularly advantageous since an overfilled state of the container 19 having too high a fill level 16 of the filling material 17 can be detected only using imprecise measurement values of the fill level 16 or cannot be detected at all by the radar sensor unit 11 alone.

Figure 2:
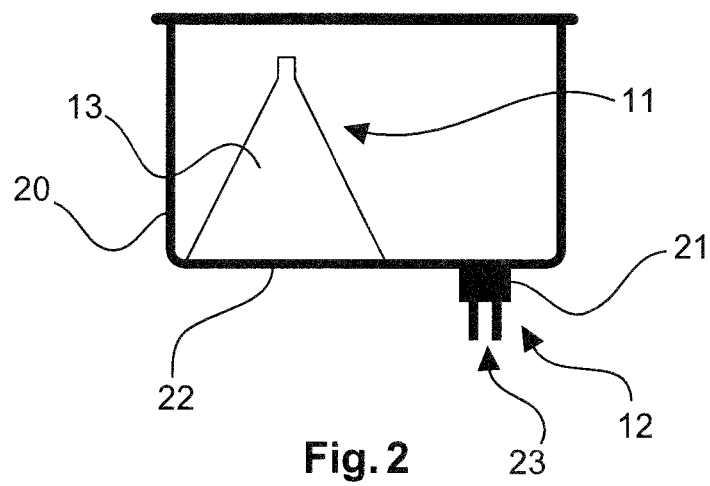
FIG. 2 shows an arrangement of a radar sensor unit and a limit level sensor unit in the form of a vibration sensor according to an embodiment of the invention.

FIG. 2 shows a possible arrangement of the radar sensor unit 11 inside the housing 20 and the limit level sensor 12 on the housing 20. In this case, the limit level sensor 12 is configured as a vibration sensor 21, a tuning fork 23 identifying a change in a vibration and thus being able to identify an overfilled state, i.e. that the spacing between the filling material surface 15 and the radar antenna 13 has fallen below the minimum spacing 18, as soon as said fork comes into contact with the filling material 17 (not shown). The radar antenna 13 of the radar sensor unit 11 is closed by a cover 22 for example, the cover 22 being located between the radar antenna 13, which is designed as a horn antenna for example, and the filling material surface 15 (not shown in FIG. 2). In this case, the tuning fork is arranged vertically on the housing 20, such that the tuning fork 23 of the vibration sensor 21 points towards the filling material surface 15 of the filling material 17. In the case of this arrangement, it is possible to detect that the spacing between the filling material surface 15 and the radar antenna 13 has fallen below the minimum spacing 18 before the filling material surface 15, and therefore the fill level 16, has reached the radar antenna 13. This is in particular the case before the fill level 16 has reached the housing 20 in which the radar antenna 13 is located, meaning that flooding of the radar antenna 13 or of the housing 20 can be detected before the spacing has fallen below the minimum spacing 18.

Figure 3:
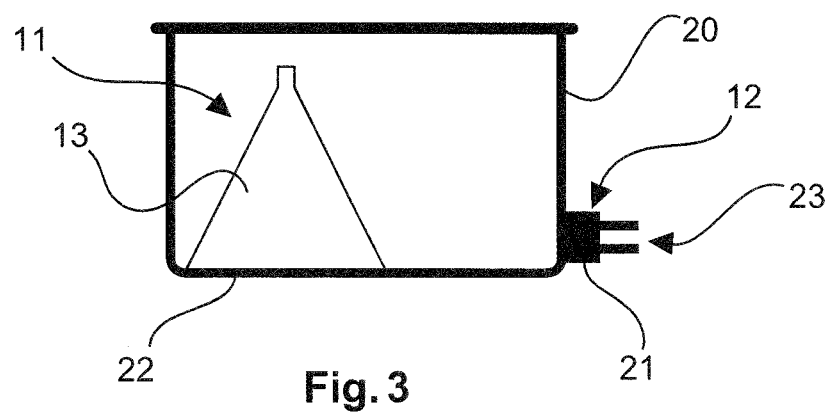
FIG. 3 shows an arrangement of a radar sensor unit and a limit level sensor unit in the form of a vibration sensor according to a further embodiment of the invention.

FIG. 3 shows a further arrangement of the radar antenna 13, which is again located in the housing 20, and the limit level sensor 12. In this case, the limit level sensor 12 is fastened to the housing 20 such that the tuning fork 23 of the vibration sensor 21 is oriented horizontally and thus the tuning fork 23 is also oriented in parallel with the filling material surface 15 (not shown). This arrangement can detect when the spacing between the filling material surface 15 and the radar antenna 13 has fallen below the minimum spacing 18 if at least part of the housing 20, and therefore the tuning fork 23 of the vibration sensor 21 or of the limit level sensor 12, is in contact with the filling material 17.

Figure 4:
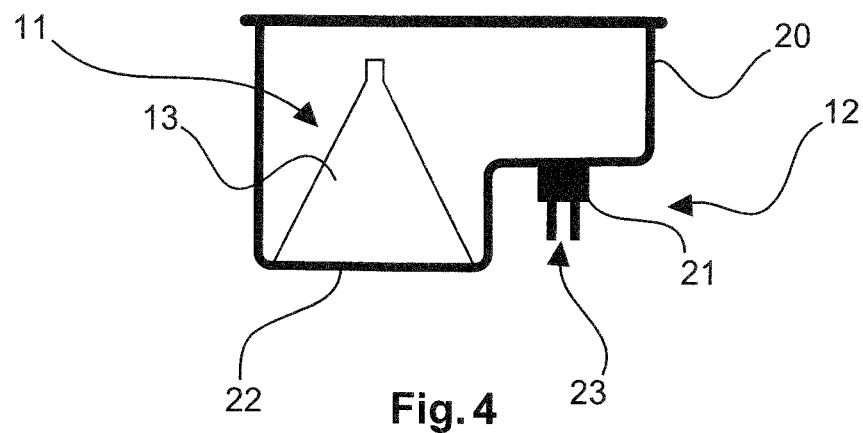
FIG. 4 shows an arrangement of a radar sensor unit and a limit level sensor unit in the form of a vibration sensor according to a further embodiment of the invention.

FIG. 4 shows a further arrangement of the radar antenna 13 in the housing 20, the limit level sensor 12 being oriented vertically. This means that the limit level sensor 12, which is designed as a vibration sensor 21, comprises the tuning fork 23 which points towards the filling material surface 15. The vibration sensor 21 is attached in a recess on the housing 20. In the example shown in FIG. 4, too, it is only detected that the spacing between the filling material surface 15 and the radar antenna 13 has fallen below the minimum spacing 18 when at least part of the housing 20, and in particular the cover 22 of the radar antenna 13, is in contact with the liquid.

This correspondence results from the fact that the tuning fork 23 is intended to be in contact with the filling material 17 in order for the limit level sensor 12 or the vibration sensor 21 to detect that a limit level has been exceeded or that the spacing between the filling material surface 15 and the radar antenna 13 has fallen below the minimum spacing 18.

Figure 5:
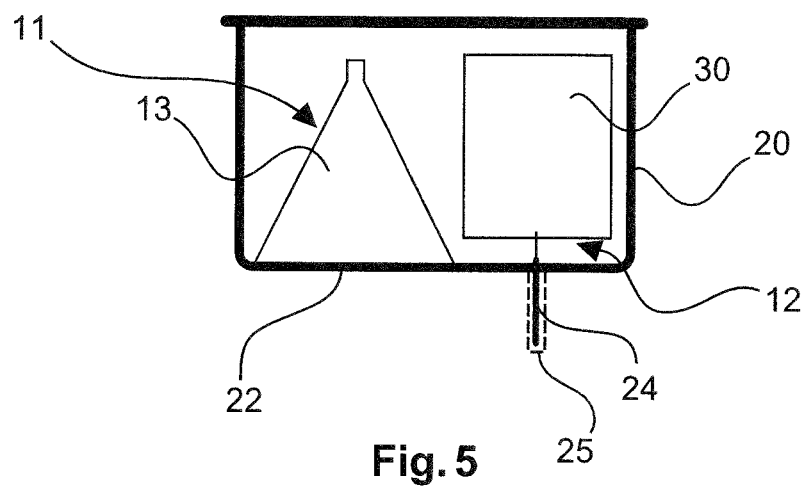
FIG. 5 shows an arrangement of a radar sensor unit and a limit level sensor unit for carrying out time-domain reflectometry according to an embodiment of the invention.

FIG. 5 shows an arrangement of a radar fill level measurement device 10 comprising a radar antenna 13 of a radar sensor unit 11 and a limit level sensor 12, which is designed to detect, using time-domain reflectometry (TDR), when the spacing between the filling material surface 15 and the radar antenna 13 falls below the minimum spacing 18. For this purpose, a rod 24 is attached at a lower end of the housing 20, which rod extends in part inside the housing 20 and in part outside the housing. The rod 24 can be bare metal or can be surrounded by insulation 25. In this case, in particular the part of the rod 24 which protrudes out of the housing 20 is surrounded by the insulation 25. The rod 24 can also be insert moulded together with the housing 20. An insulation layer of the insulation 25 should preferably not exceed a specified maximum thickness.

In addition, an electronics unit 30 is provided in the housing 20, which unit is connected to the rod 24 in an electrically conductive manner. In order to detect whether the spacing has fallen below the minimum spacing 18, what is known as a TDR signal is introduced at the rod 24. It is thus possible to identify whether the fill level 16 has exceeded a specific limit value and whether, consequently, it is necessary to output a warning signal indicating an overfilled state of the container 19 (not shown here). An overfilled state can already be detected using the configuration shown in FIG. 5 even if the fill level 16, i.e. the filling material surface 15, has not yet reached the housing 20.

Figure 6:
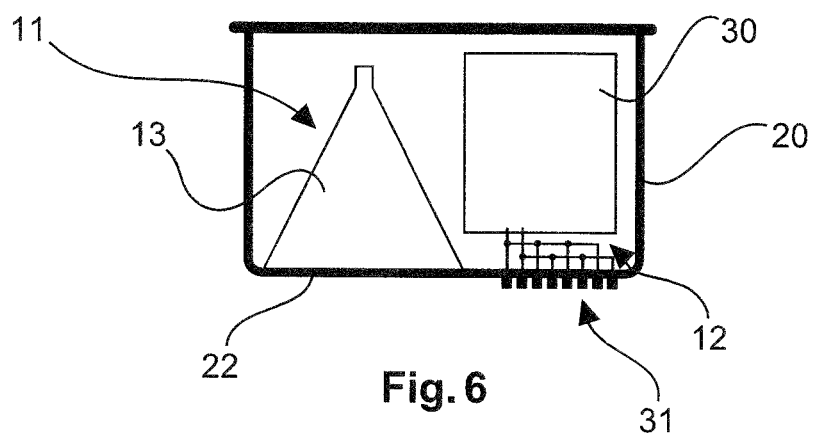
FIG. 6 shows an arrangement of a radar sensor unit and a limit level sensor unit for conductive measurement according to an embodiment of the invention.

FIG. 6 shows an arrangement of a radar fill level measurement device 10 comprising a radar antenna 13 of a radar sensor unit 11 and a limit level sensor. In this case, the limit level sensor 12 is designed to detect, by means of a conductive measurement, that the spacing between the filling material surface 15 and the radar antenna 13 has fallen below the minimum spacing 18. For this purpose, electrodes 31 are provided outside the housing 20, which electrodes can form part of the limit level sensor unit 12. The electrodes 31 can be connected in an electrically conductive manner to an electronics unit 30 located in the housing 20. Upon reaching the electrodes 31, which are fastened on the outside of the housing 20, an approaching filling material surface 15 can cause a change in the conductivity, with the result that it is possible to detect, on account of the change in the conductivity, that the spacing has fallen below the minimum spacing 18 or that a limit value of the fill level 16 has been exceeded.

It should be noted that, for the conductive measurement, at least two electrodes 31 are attached to the outer surface or the outer side of the housing 20 and are brought into contact with the inside of the housing 20 and thus with the electronics unit 30. The electrodes 31 are preferably attached on an underside of the housing 20, and therefore point towards the filling material surface 15. The electrodes 31 can be metal rods or metallisations on the housing 20, the housing 20 being produced from a plastics material for example. The metallisations or electrodes 31 can also be attached on an extension on the housing 20 projecting towards the filling material surface 15.

Figure 7:
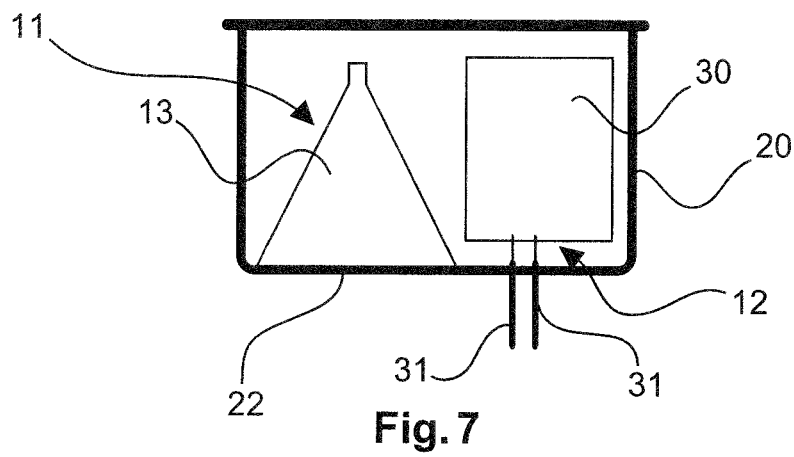
FIG. 7 shows an arrangement of a radar sensor unit and a limit level sensor unit for conductive measurement according to a further embodiment of the invention.

FIG. 7 shows a further arrangement of a radar fill level measurement device 10 comprising a radar antenna 13 of a radar sensor unit 11 and a limit level sensor 12. In this case, the limit level sensor 12 is likewise designed to detect, by means of a conductive measurement, that the spacing between the filling material surface 15 and the radar antenna 13 has fallen below the minimum spacing 18. For this purpose, two rods, which form the electrodes 31, protrude out of the housing 20. The electrodes 31 are in turn brought into electrically conductive contact with the electronics unit 30 inside the housing 20.

Figure 8:
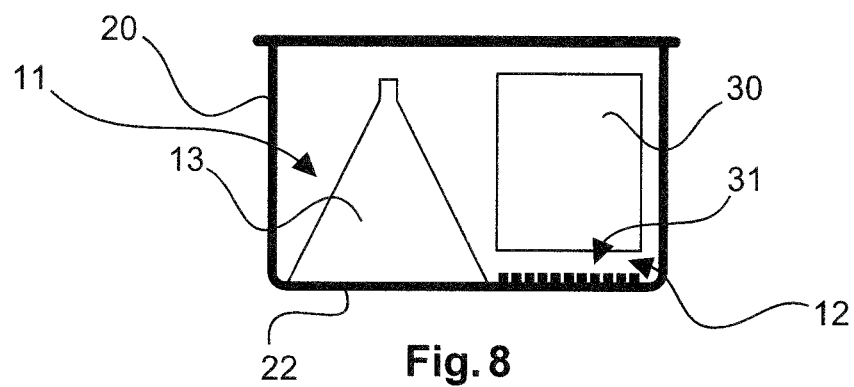
FIG. 8 shows an arrangement of a radar sensor unit and electrodes of a limit level sensor unit for capacitive measurement according to an embodiment of the invention.

FIG. 8 shows a radar sensor unit 11 comprising a radar antenna 13 in a housing 20, the limit level sensor 12 comprising electrodes 31 and/or an electronics unit 30. In this case, the limit level sensor 12 is designed to capacitively measure when the spacing between the filling material surface 15 and the radar antenna 13 falls below the minimum spacing 18. In this case, the electrodes 31 for the capacitive measurement are arranged inside the housing 20 for example. Said electrodes are arranged beside the radar antenna 13 as a strip-like structure for example. The electrodes 31 can extend for example in parallel with one another and/or on an inner surface of the housing 20.

Figure 9:
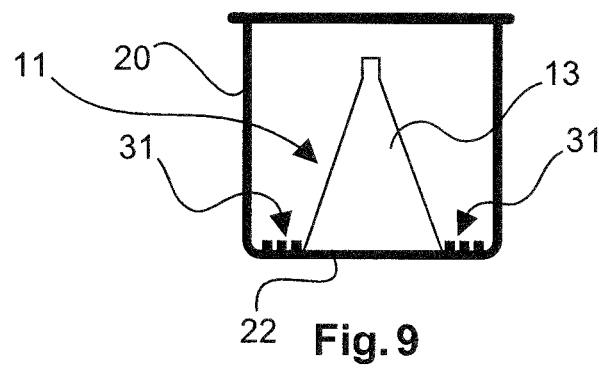
FIG. 9 shows an arrangement of a radar sensor unit and electrodes of a limit level sensor unit for capacitive measurement according to a further embodiment of the invention.

FIG. 9 shows an arrangement of the electrodes 31 for capacitively measuring when the spacing between the filling material surface 15 and the radar antenna 13 falls below the minimum spacing 18, in which the electrodes 31 are arranged in an annular manner around the radar antenna 13. In this case, the radar antenna 13 and the electrodes 31 are arranged inside the housing 20. In this case, the electrodes 31 can be arranged in an annular manner around the radar antenna 13 on a housing base and/or an inner surface of the housing 20 for example. In particular, the electrodes 31, which are arranged in an annular manner around the radar antenna 13, can be arranged in the region of the cover 22 of the radar antenna 13 of the radar sensor unit 11. If more than 2 electrodes are used, one of the electrodes 31 can function as a shield electrode for reducing the sensitivity to deposits and dirt, in the manner known from capacitive measurement technology.

Figure 10:
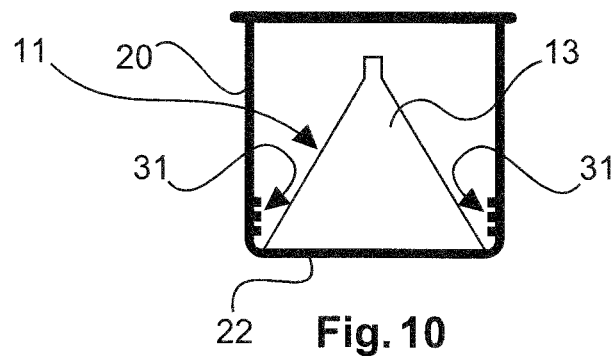
FIG. 10 shows an arrangement of a radar sensor unit and electrodes of a limit level sensor unit for capacitive measurement according to a further embodiment of the invention.

FIG. 10 shows a further arrangement of the electrodes 31 for capacitively measuring when the spacing between the filling material surface 15 and the radar antenna 13 falls below the minimum spacing 18, the electrodes 31 of the limit level sensor 12 likewise being arranged in an annular manner around the radar antenna 13, but now extending along a side surface of the housing 20. In this case, too, the electrodes 31 are arranged in the region of the cover 22 of the housing 20. This configuration provides an even more space-saving variant for example, with the result that the size of the housing 20 can be substantially adjusted to the extent of the radar antenna 13, which is a horn antenna for example.

Figure 11:
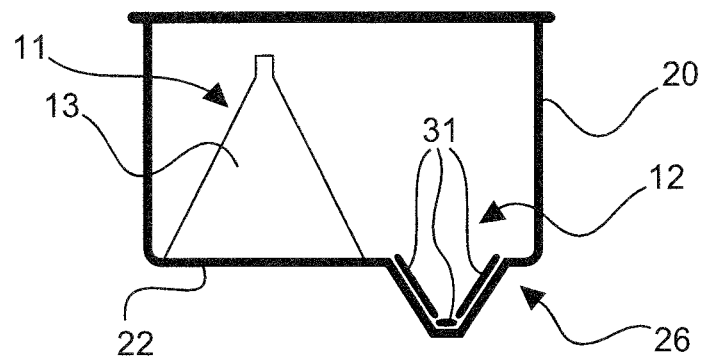
FIG. 11 shows an arrangement of a radar sensor unit and electrodes of a limit level sensor unit for capacitive measurement according to a further embodiment of the invention.

FIG. 11 shows a further arrangement of a radar fill level measurement device 10 comprising a radar antenna 13 and a limit level sensor 12, the limit level sensor 12 comprising a plurality of electrodes 31 arranged in an extension 26 of the housing 20, and an electronics unit 30, which is not shown here for reasons of clarity. This arrangement is a further possibility for capacitively measuring when the spacing between the filling material surface 15 and the radar antenna 13 falls below the minimum spacing. The extension 26, together with the electrodes 31 arranged therein, protrudes out of the housing 20 towards the filling material surface 15, the electrodes 31 being arranged inside the housing 20. The extension 26 is a protuberance from the housing 20 for example, which protuberance is arranged beside the radar antenna 13. With reference to a vertical direction which extends perpendicularly to the filling material surface 15, the extension 26 can begin where the radar antenna 13 ends. The extension 26 can taper towards the filling material surface 15, as shown in FIG. 11. In particular, when viewed in cross section the extension 26 can protrude towards the filling material 17 approximately in the shape of a triangle having a blunted tip. Accordingly, the extension 26 can be provided as a three-dimensional body on the housing 20, for example in the form of a truncated cone or a truncated pyramid. However, the extension 26 can also have a triangular cross section over a specified length or over the entire width of the housing 20. This configuration then has an edge on an underside of the extension 26. It is possible for three electrodes 31 to be provided in the extension 26, two of the electrodes 31 being attached to a tapering portion of the extension 26 and a further electrode 31 being horizontally attached to a base of the extension 26. Here, too, it is already possible to detect when the spacing between the filling material surface 15 and the radar antenna 13 falls below the minimum spacing 18, even when the fill level 16 has not yet reached the cover 22 of the radar antenna 13.

Figure 12:
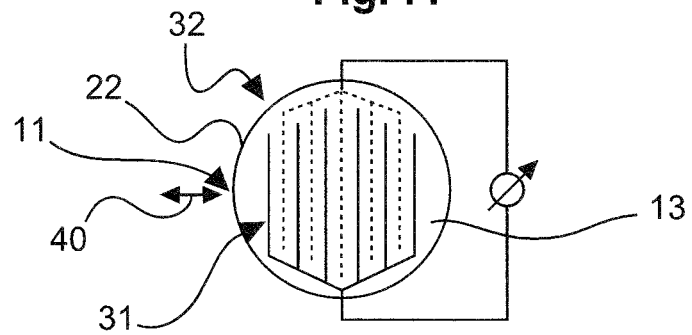
FIG. 12 shows a strip-like arrangement of electrodes of a limit level sensor unit for capacitive measurement in a cover of a radar sensor unit according to an embodiment of the invention.

FIG. 12 is a sectional plan view of a cover 22 of a radar antenna 13, electrodes 31 for capacitively measuring when the spacing between the filling material surface 15 and the radar antenna 13 falls below the minimum spacing 18 being arranged in the cover 22. In particular, the electrodes 31 are arranged in a strip-like structure 32 in the cover 22. The strip-like structure 32 is comparable to a comb-like structure, in which the electrodes 31 mesh with one another. In particular, two electrodes 31 can be provided, each electrode comprising a plurality of parallel strip-like portions. In this case, it can be provided for the electrodes to be injection moulded on the cover 22 or in the housing 20 in the form of metal inserts in the plastics material. In addition, the electrodes 31 can also be metallised on the plastics material. The strip-like structure 32 is formed for example by an arrangement of a plurality of parallel electrodes 31 for the capacitive measurement. This makes it possible for a signal, in particular a microwave signal, of a specific polarisation direction 40 to pass or to be transmitted through the strip-like structure 32 of the electrodes 31 as long as the strip-like structure 32, i.e. the parallel strip-like electrodes 31, is arranged at an angle of 90° to the electrical field of the signals or microwave signals. In particular, the strip-like structure 32 can also be used as a polarisation filter and thus improve the properties of the radar antenna 13. For this purpose, the strip-like structure 32 is arranged in the cover 22 and is thus located between the radar antenna 13 and the filling material surface 15.

Figure 13:
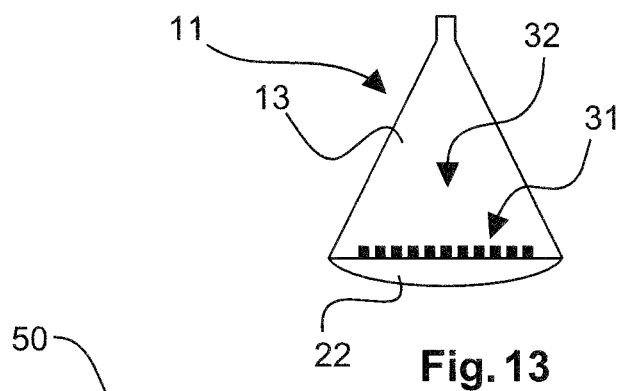
FIG. 13 is a sectional side view of a strip-like structure of electrodes of a limit level sensor unit for capacitive measurement according to an embodiment of the invention.

FIG. 13 is a sectional side view of the cover 22 from FIG. 12. It can be seen here that the electrodes 31 are provided on or in the cover 22 and are thus arranged between the radar antenna 13 and the filling material surface 15 (not shown here). In this case, the electrodes 31 are arranged in the strip-like structure 32. It should be noted that the cover 22 can simultaneously form part of the housing 20. However, for reasons of clarity the housing 20 is not shown in FIG. 13.

Figure 14:
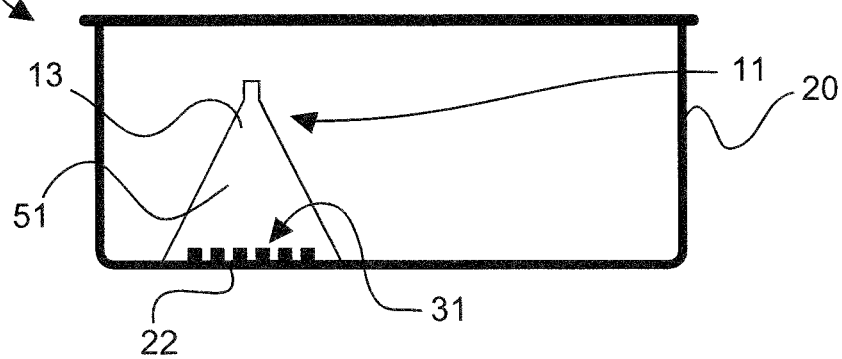
FIG. 14 shows a radar antenna arrangement for a radar fill level measurement device comprising a radar antenna horn and electrodes of a limit level sensor unit according to an embodiment of the invention.

FIG. 14 shows a radar antenna arrangement 50 comprising a housing 20 and a radar antenna horn 51, it being possible for the radar antenna horn 51 to form part of a radar antenna 13 and thus part of a radar sensor unit 11. The radar antenna arrangement 50 further comprises a limit level sensor unit 12, electrodes 31 of the limit level sensor unit 12 being shown in FIG. 14. The cover 22 forms part of the housing 20 in which the radar antenna horn 51 and the limit level sensor unit 12 comprising the electrodes 31 are arranged. The electrodes 31 for the capacitive measurement can form part of the limit level sensor unit 12 for example.

Figure 15:
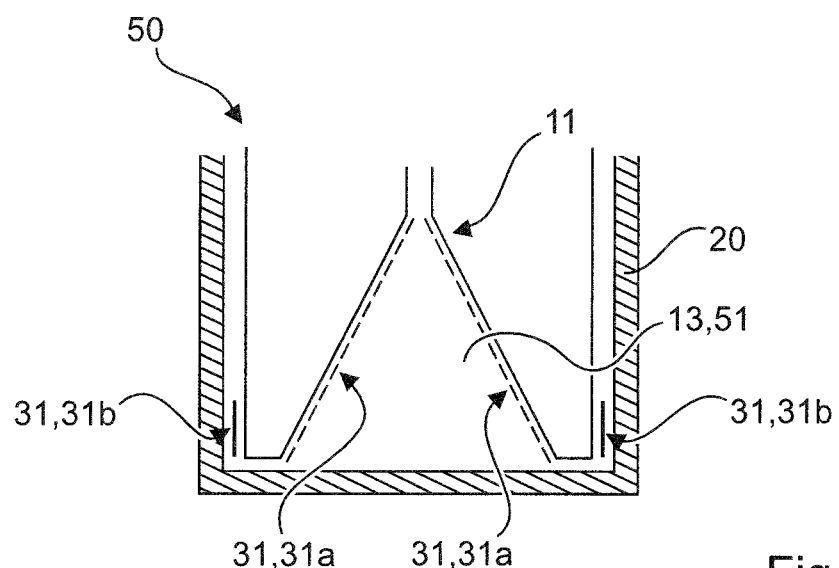
FIG. 15 shows an arrangement of a radar sensor unit and electrodes of a limit level sensor unit for capacitive measurement according to a further embodiment of the invention.
Figure 16A:
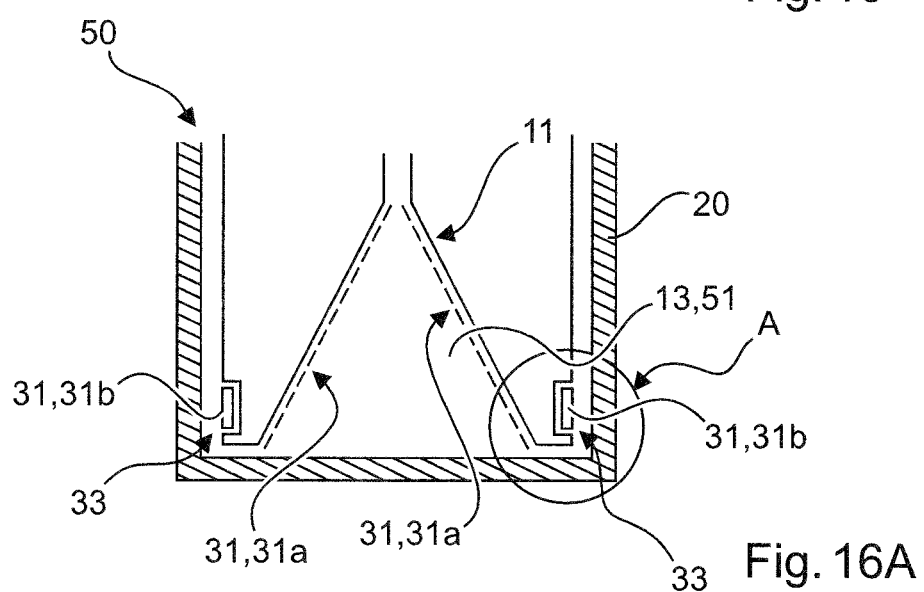
FIG. 16A shows an arrangement of a radar sensor unit and electrodes of a limit level sensor unit for capacitive measurement according to a further embodiment of the invention.
Figure 16B:
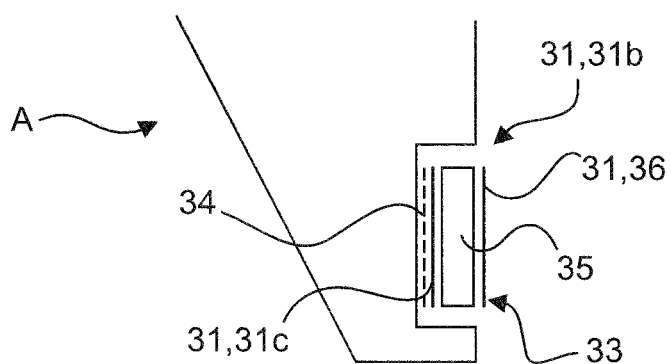
FIG. 16B is a detail of an electrode according to an embodiment of the invention.

FIGS. 15 and 16A show radar antenna arrangements 50 in which the electrodes 31 for a capacitive measurement are attached to the radar antenna 13 or to the radar antenna horn 51. The radar antenna 13 is in turn arranged in the housing 20, which is also referred to as the casing or sensor housing. The radar antenna horn 51 comprises a plastics material which is metallised inside the cone, i.e. on an inner surface of the radar antenna horn 51, and which has an earth potential. A metallisation 31a is thus formed on the radar antenna horn 51. Said metallisation 31a functions for example as a first electrode 31, 31a for measuring the capacitance. A second electrode 31, 31b is arranged on an outside side surface of the radar antenna horn 51. The second electrode 31, 31b can likewise be formed by a metallisation 31b for example. A capacitance can be measured between the first electrode 31, 31a and the second electrode 31, 31b, which capacitance changes when the housing 20 is flooded. The second electrode 31, 31b can be applied or attached to the radar antenna 13 by means of vacuum deposition, LDS (laser direct structuring) or by gluing on a metal film, for example a flexible circuit board 33. Detail A in FIG. 16B shows that the flexible circuit board 33 can comprise a substrate 35, such as polyimide, a metallisation layer 36 as an electrode 31 on an upper side, and an optional metallisation layer as a shield electrode 31c on a rear side of the circuit board 33. The circuit board 33 can be glued to the radar antenna horn 51 by means of adhesive film 34. The use of the additional, optional shield electrode 31c results in reduced sensitivity to deposits or condensation. The radar antenna horn 51 can be incorporated in the sensor housing 20.

It should additionally be noted that expressions such as "comprising" or the like do not exclude the possibility of further elements or steps, and "a" and "an" do not exclude the possibility of a plurality. It should further be noted that features or steps which have been described with reference to one of the above embodiments may also be used in combination with other features or steps of other above-described embodiments. Reference numerals in the claims should not be interpreted as limiting.

The invention claimed is:

1. A radar fill level measurement device, comprising:
   a radar sensor unit includes a radar antenna emitting a measurement signal towards a filling material surface, the radar sensor unit being configured to determine a fill level of the filling material; and
   a limit level sensor unit configured to detect when a spacing between the filling material surface and the radar antenna falls below a predetermined minimum spacing, wherein the limit level sensor unit is further configured to indicate that the fill level measurement values measured by the radar sensor unit are below an accuracy threshold for a type of a radar sensor that has a reduced measurement results accuracy in a short range, and configured to output a warning that the fill level is too high when the spacing has fallen below the predetermined minimum spacing or the radar sensor unit is flooded,
   wherein the limit level sensor unit detects, using a capacitive measurement, that the spacing between the filling material surface and the radar antenna has fallen below the minimum spacing,
   wherein electrodes are attached in the housing of the radar fill level measurement device for the capacitive measurement, and
   wherein the electrodes for the capacitive measurement have a strip-like structure and are arranged relative to the radar sensor unit such that an electrical field of a signal emitted by the radar sensor unit is arranged perpendicularly to the strip-like structure.

2. The radar fill level measurement device according to claim 1, further comprising: a housing in which the radar antenna is arranged, wherein the limit level sensor unit is arranged on or in the housing.

3. The radar fill level measurement device according to claim 1, wherein the limit level sensor unit is configured to detect, using an electromagnetic signal, that the spacing between the filling material surface and the radar antenna has fallen below the minimum spacing.

4. The radar fill level measurement device according to claim 2, wherein the limit level sensor unit is a vibration sensor attached to the housing.

5. The radar fill level measurement device according to claim 1, wherein the limit level sensor unit detects, using a conductive measurement, that the spacing between the filling material surface and the radar antenna has fallen below the minimum spacing.

6. The radar fill level measurement device according to claim 5, wherein at least two electrodes are attached to the housing of the radar fill level measurement device for the conductive measurement.

7. The radar fill level measurement device according to claim 1, wherein the electrodes for the capacitive measurement are arranged in the housing in an annular manner around the radar sensor unit.

8. The radar fill level measurement device according to claim 1, wherein the radar antenna has a cover in which the electrodes for the capacitive measurement are integrated.

9. The radar fill level measurement device according to claim 8, wherein the electrodes for the capacitive measurement are injection molded into the cover of the radar antenna in the form of metal inserts.

10. The radar fill level measurement device according to claim 1, wherein at least part of the limit level sensor unit is arranged between the radar sensor unit and the filling material.

11. The radar fill level measurement device according to claim 2, wherein the limit level sensor unit is arranged at least in part in an extension protruding out of the housing.

12. A radar antenna arrangement for a radar fill level measurement device, comprising:
    a radar antenna including a housing and/or a cover, the radar antenna emitting a measurement signal towards a filling material surface, the radar sensor unit being configured to determine a fill level of the filling material; and
    a limit level sensor unit configured to detect when a spacing between the filling material surface and the radar antenna falls below a predetermined minimum spacing, wherein the limit level sensor unit is further configured to indicate that the fill level measurement values measured by the radar sensor unit are below an accuracy threshold for a type of a radar sensor that has a reduced measurement results accuracy in a short range, and configured to output a warning that the fill level is too high when the spacing has fallen below the predetermined minimum spacing or the radar sensor unit is flooded,
    wherein at least part of the limit level sensor unit is (a) arranged on the housing, (b) arranged on the cover or (c) integrated therein,
    wherein the limit level sensor unit detects, using a capacitive measurement, that the spacing between the filling material surface and the radar antenna has fallen below the minimum spacing,
    wherein electrodes are attached in the housing of the radar fill level measurement device for the capacitive measurement, and
    wherein the electrodes for the capacitive measurement have a strip-like structure and are arranged relative to the radar sensor unit such that an electrical field of a signal emitted by the radar sensor unit is arranged perpendicularly to the strip-like structure.

13. The radar fill level measurement device according to claim 1, wherein when the fill level measurements values are below the accuracy threshold, the measurement values determined by the radar sensor unit are no longer used for subsequent evaluations.

14. The radar antenna arrangement according to claim 12, wherein when the fill level measurement values measured are below the accuracy threshold, the measurement values determined by the radar sensor unit are no longer used for subsequent evaluations.

* * * * *